Dec. 15, 1964  W. A. McCORMICK, JR  3,160,993
METHOD AND APPARATUS FOR DEFLASHING MOLDED RESILIENT PIECES
Filed Aug. 5, 1963  11 Sheets-Sheet 1

Fig. 1.

INVENTOR:
William A. McCormick, Jr.
BY Connolly and Hutz
ATTORNEYS

Dec. 15, 1964   W. A. McCORMICK, JR   3,160,993
METHOD AND APPARATUS FOR DEFLASHING MOLDED RESILIENT PIECES
Filed Aug. 5, 1963   11 Sheets-Sheet 3

Fig. 3.

INVENTOR
William A. McCormick, Jr.
BY Connolly and Hutz
ATTORNEYS

Dec. 15, 1964   W. A. McCORMICK, JR   3,160,993
METHOD AND APPARATUS FOR DEFLASHING MOLDED RESILIENT PIECES
Filed Aug. 5, 1963   11 Sheets-Sheet 8

INVENTOR:
William A. McCormick, Jr.,
BY Connolly and Hutz
ATTORNEYS

Dec. 15, 1964    W. A. McCORMICK, JR    3,160,993
METHOD AND APPARATUS FOR DEFLASHING MOLDED RESILIENT PIECES
Filed Aug. 5, 1963    11 Sheets-Sheet 9

INVENTOR
William A. McCormick, Jr.,
BY Connolly and Hutz
ATTORNEYS

Dec. 15, 1964    W. A. McCORMICK, JR    3,160,993
METHOD AND APPARATUS FOR DEFLASHING MOLDED RESILIENT PIECES
Filed Aug. 5, 1963    11 Sheets-Sheet 10

INVENTOR
William A. McCormick, Jr.
BY Connolly and Hutz
ATTORNEYS

Dec. 15, 1964   W. A. McCORMICK, JR   3,160,993
METHOD AND APPARATUS FOR DEFLASHING MOLDED RESILIENT PIECES
Filed Aug. 5, 1963   11 Sheets-Sheet 11

INVENTOR
William A. McCormick, Jr.,
BY Connolly and Hutz
ATTORNEYS

United States Patent Office 3,160,993
Patented Dec. 15, 1964

3,160,993
METHOD AND APPARATUS FOR DEFLASHING MOLDED RESILIENT PIECES
William A. McCormick, Jr., Hagerstown, Md., assignor to The Pangborn Corporation, Hagerstown, Md., a corporation of Delaware
Filed Aug. 5, 1963, Ser. No. 299,959
29 Claims. (Cl. 51—9)

The present invention is a continuation-in-part of patent application Serial No. 248,026, filed December 28, 1962, now abandoned and relates to an improved method and apparatus for removing under cold conditions trimmings, flashings, fins, etc. from molded resilient pieces particularly those pieces molded or otherwise formed from rubber. More particularly, the present invention relates to an air curtain used in combination with a deflashing apparatus. The curtain operates across the doorways whenever the doors to the apparatus are open for loading and unloading pieces to prevent warm air from entering the cold interior of the apparatus.

Heretofore, the excess rubber flashing or trim has been removed from rubber molded parts by simultaneously freezing the parts and tumbling them in a suitable tumbling barrel assembly. In these barrel assemblies, an abrasive media is used which is tumbled along with the rubber pieces. This barrel operation has proved to be unsatisfactory in many instances in that many rubber molded pieces have certain area or surfaces which are more or less hidden and not accessible to the abrasive media. This unsatisfactory result occurs since the abrasive media must be of a certain size and mass to be effective. Usually, such media is too large in size to satisfactorily remove the excess trim from the abovementioned certain hidden areas and surfaces which are found in many parts which have complex shape.

Furthermore, in the above tumbling barrel technique the entire piece being deflashed is frozen because of the length of time required in completely deflashing by the tumbling method. In view of the above, the barrel method for tumbling the parts thus required unnecessarily expensive freezing gas consumption and machine time. Also, stress cracks tend to develop in the completely frozen parts. In addition, certain projecting or edge portions of the pieces which are slightly thicker than the flashing and should remain with the pieces are also broken off since the entire piece is so completely frozen.

It is thus seen that the tumbling barrel method has proved to be completely unsatisfactory for general use in deflashing molded rubber parts.

Recently, a method and apparatus (Patent No. 2,-996,846) has been developed wherein the rubber pieces to be trimmed are loaded in a trough shaped endless conveyer which is enclosed in an insulated housing. As the rubber pieces are tumbled in the trough shaped conveyer, the pieces are subjected to a spray or blast of a freezing medium such as Dry Ice particles or liquid carbon dioxide. This freezing step is timed so as to bring about a differential freezing of the pieces wherein the fins or trimming of the pieces are frozen but the main body of the piece itself is not substantially frozen. In this differentially frozen condition, the pieces are then subjected to a blasting operation wherein abrasive media is propelled at great force against the frozen rubber pieces as they are tumbled in the trough conveyer whereby the abrasive removes only the excess trimming on the pieces. In view of the relatively small size of the steel shot abrasive generally used, any generally inaccessible surface or area of the excess trimming of the rubber pieces is subjected to the abrasive treatment.

With the above latter arrangement, the disadvantages mentioned above in connection with the barrel tumbling operation are substantially eliminated.

An object of the present invention is to provide a new and novel apparatus and method having improvements over the above-described apparatus and methods used heretofore, particularly with respect to the second method and apparatus described above.

The primary object of the present invention is to provide a deflashing apparatus for removing trim from resilient molded articles which includes an air curtain operating across the doorway or doorways of the apparatus to prevent warm air from entering the cold interior of the apparatus when the doors are open.

Other objects and advantages of the invention will become more apparent from a study of the following description and drawings wherein.

Referring now to FIGURES 1 through 5, which show the general makeup of the apparatus, an overall housing 1 is provided and serves as a dehumidifying or refrigeration chamber in which the operating units of the apparatus are housed. As shown better in FIGURES 1 and 4, the housing 1 has formed heavy walls. The wall panels are preferably formed of inner and outer sheets of plywood which form a sandwich structure with insulation such as Fiberglas positioned between the plywood sheets. The exterior of the housing 1 is clad with galvanized steel backers or sheets. A refrigeration evaporator 2 is supported in the upper right hand corner of the housing for dehumidifying and cooling the interior of housing 1 (see FIGURE 1).

In the front wall of the housing, there is a loading and unloading doorway 3 for loading and removing the rubber parts from within the housing 1. As seen better in FIGURES 1–3, the door 5 of the housing 1 is raised and lowered in tracks 7 by the hoisting mechanism generally indicated at 9 to expose and close off doorway 3.

Figure 3:
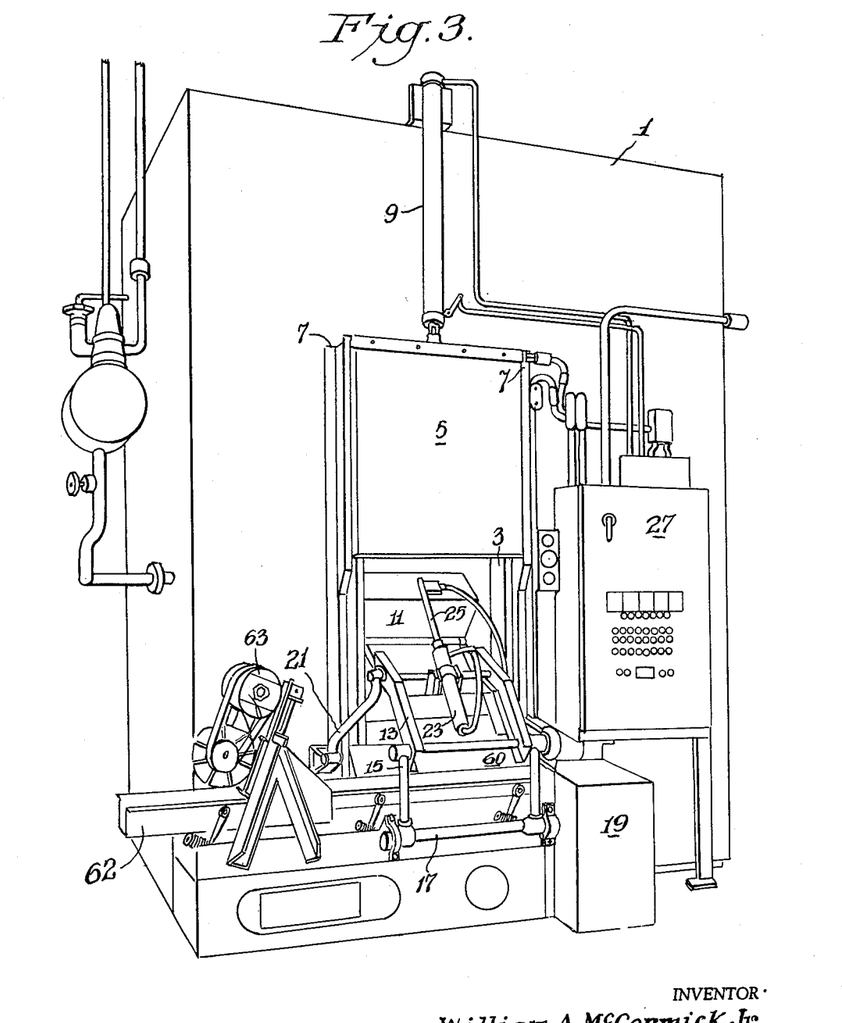
FIGURE 3 is a view similar to that of FIGURE 2 showing the door to the housing of the apparatus in raised position and with the rubber piece loader mechanism in loading position.

As better seen in FIGURE 3, the lower portion or closed position portion of tracks 7 curves and extends inwardly from the upper portion or open position of the tracks 7. With this arrangement, a good tight seal is provided between door 5 and doorway 3 when the door is in the closed position.

Figure 1:
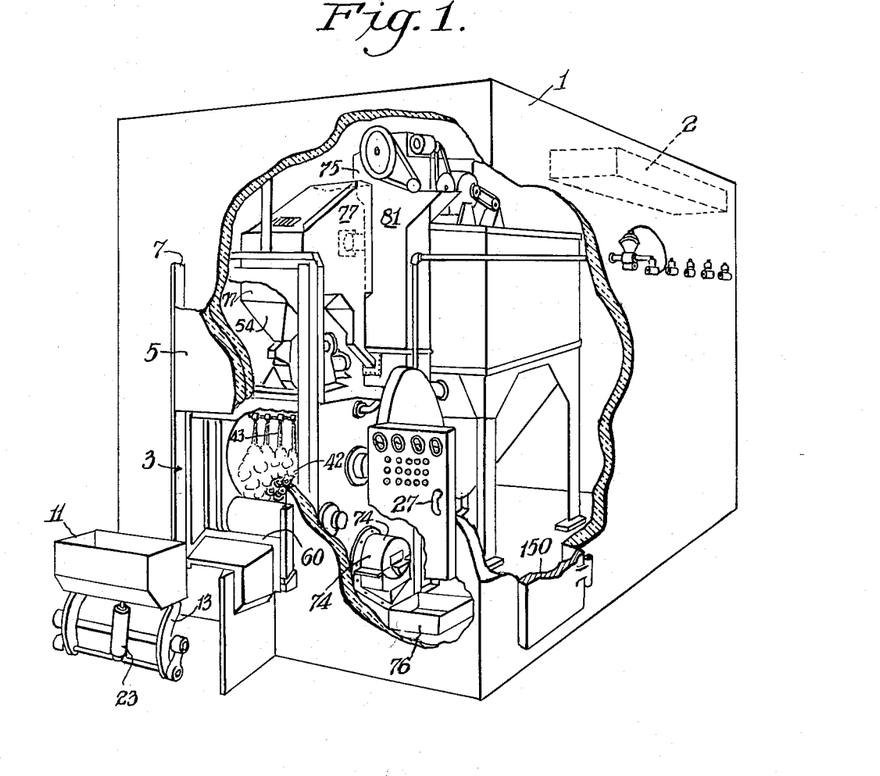
FIGURE 1 is a perspective partially broken away of the overall apparatus of the present invention.
Figure 2:
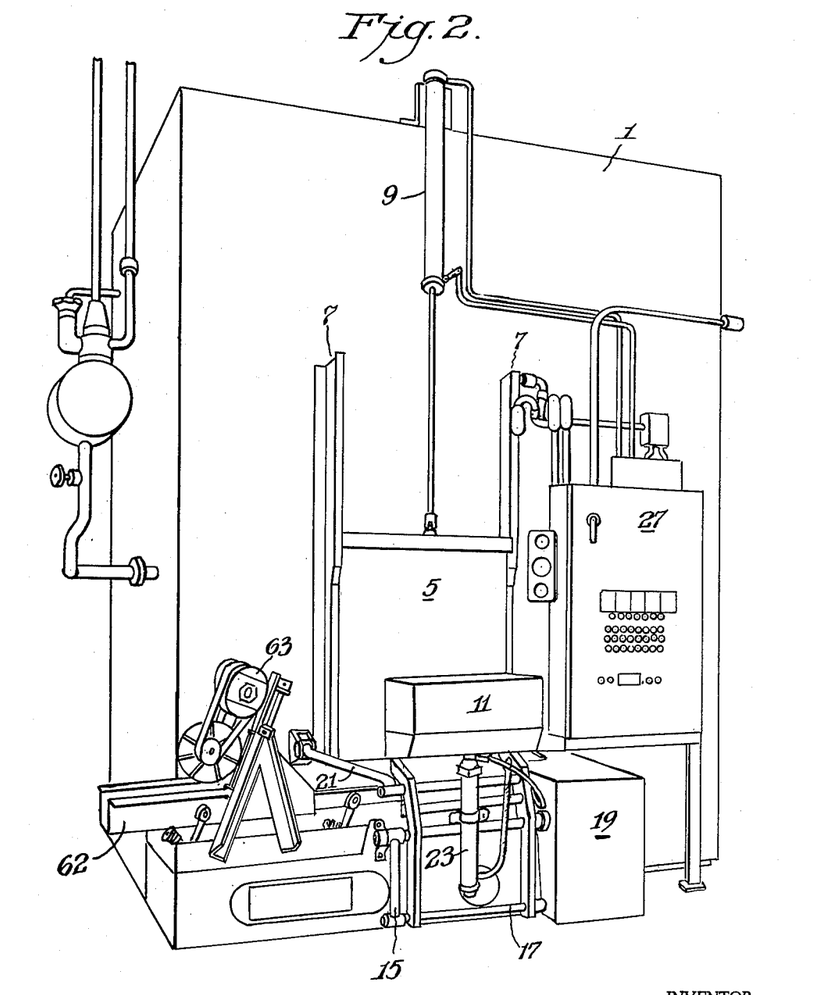
FIGURE 2 is a perspective of the apparatus of the present invention showing more particularly the front of the apparatus.

For loading and unloading the rubber pieces from a point externally of the housing 1, through the doorway 3 and into the freezing and abrasive treating area which will be described later, there is provided as better seen in FIGURES 1–3 a loading bucket 11 pivotally supported on arms 13 which are in turn pivotally supported on a bracket 15 mounted in fixed manner on drive shaft 17. Drive shaft control 19 rotates the shaft 17 to in turn raise the bracket 15, the bucket supporting arms 13 and the bucket 11 supported thereby to a position adjacent the top of the open doorway as seen in FIGURE 3. A side guide arm 21 pivotally connected to the housing 1 and an arm 13 guides or pulls the bucket 11 inwardly within the doorway 3. When the bucket is raised to this uppermost position, pressure cylinder 23 connected to the bucket support and the bottom of the bucket 11 is acuated to extend its shaft 25 connected with the bottom of the bucket to tip the bucket as shown in FIGURE 3 whereby the rubber pieces loaded in the bucket will be discharged into the freezing and abrasive treating area. After discharging its load, the piston 25 is then retracted and the drive shaft 17 is rotated in the opposite direction to in turn lower the bracket 15, the arms 13 and the bucket 11 to its original station as shown in FIGURES 1 and 2. The door 5 opens automatically during the loading operation and is closed during the treating steps. Once the articles are deflashed and ready for unloading, the door 5 is automatically opened again.

The above operation of the bucket loader and door 5 is included as a part of a cycle which is automatically controlled through the control panel 27 affixed to the front face of the housing 1. The complete cycle will be explained later. The pressure cylinder can be solenoid operated.

Figure 5:
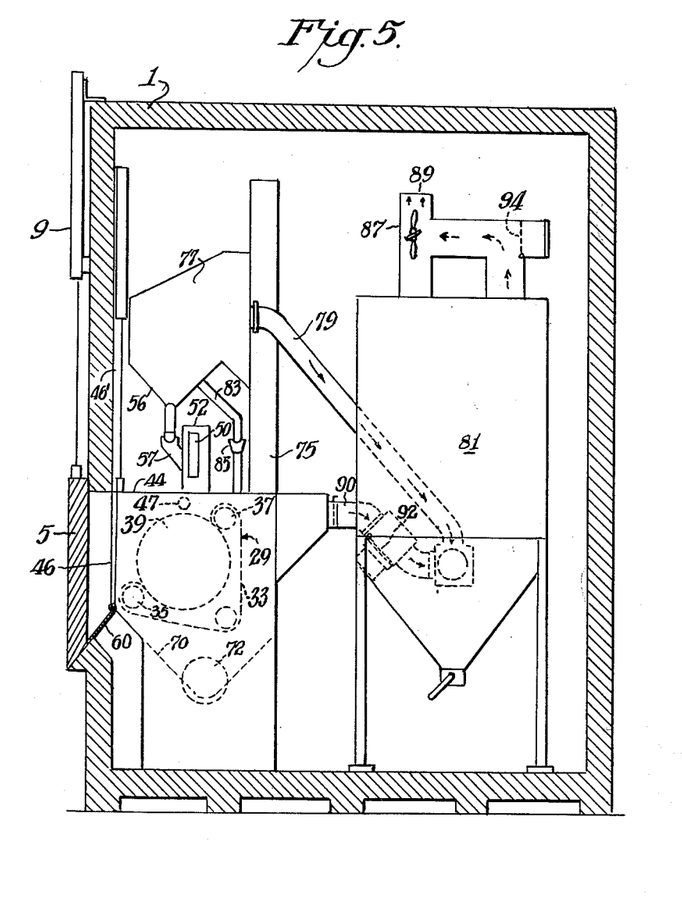
FIGURE 5 is a detail of the apparatus shown in FIGURES 1 through 4 taken from the opposite side to that of FIGURE 4.
Figure 6:
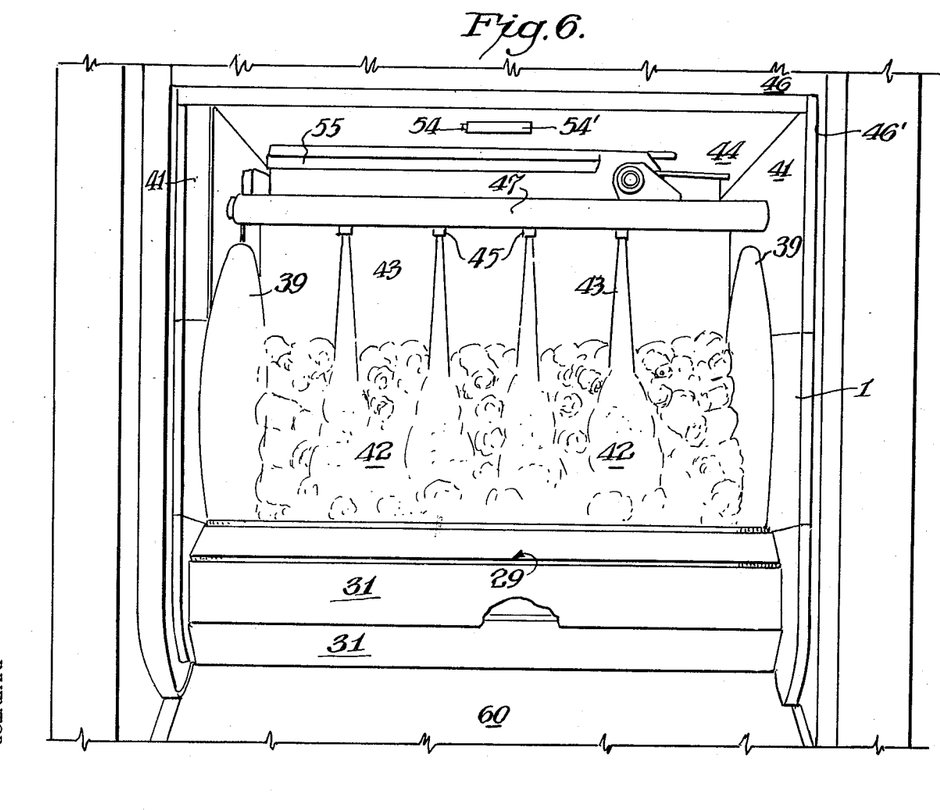
FIGURE 6 is a view on an enlarged scale of the trough shaped conveyer supported within the housing, and wherein the rubber pieces are treated both with the freezing medium and the abrasive material.

The rubber pieces are received from loading bucket 11 by a trough shaped endless belt type conveyer 29 as shown better in FIGURE 5 and especially FIGURE 6. The conveyer 29 is formed of metal bars or slats 31 (FIGURE 6) which extend transversely of the conveyer travel and are connected at their ends to a continuous sprocket chain 33 (FIGURE 5). The conveyer rotates around a front pair of guide sprockets 35 and a pair of rear drive sprockets 37 (FIGURE 5). A pair of guide disks 39 are rotatably mounted in side walls 41 which encloses the sides of conveyer trough area to provide contact with the slats 31 of the upper deck of the conveyer 29 to compel the conveyer 29 to follow a concave path which resembles a trough laterally inclined so that it faces the doorway 3.

The operation of the conveyer 29 is part of the cycle controlled from the panel 27. The endless conveyer may also be formed of a wire mesh belt instead of the bars or slats as shown. The conveyer area also includes a door 46 (see FIGURES 5 and 6) which is opened automatically through control panel 27 during the loading and unloading operation but which is closed during the freezing and abrasive treatment. Briefly, this door consists of an upper rigid portion having a lower flexible portion. The door 46 is supported by rollers in door tracks 46' which bend inwardly adjacent the bottom of the tracks. Since the lower portion of the door 46 is flexible, it follows the curved pathway defined by the lower curved portion of the tracks. The tracks 46' for the door 46 extend upwardly above the roof of the conveyer area to accommodate the door in its opened position. These structural details of the door are better shown in Patent No. 3,048,947; however, other suitable doors can be used.

After the rubber pieces 42 (see FIGURE 6) are loaded in the conveyer and before they are trimmed or deflashed, they are treated with a freezing medium 43 which can be liquid carbon dioxide, pulverized Dry Ice or other suitable freezing mediums such as liquid nitrogen.

The conveyer 29 is in operation during the freezing step whereby the pieces 42 are tumbled and turned to expose all surfaces to the freezing action.

The freezing medium used is supplied to the nozzles 45 by a common header 47 extending through and supported by the side walls 41 enclosing the conveyer area.

Again, the application of the freezing medium 43 to the work pieces 42 occurs in a definitely timed cycle controlled by or through control panel 27.

In the freezing operation, the rubber pieces 42 are differentially frozen. This means that the excess trimming, flashing, etc. is frozen to a brittle state while the thicker portions of the rubber pieces are not completely frozen and, therefore, still retain some of their resiliency. With this arrangement, the brittle thin flashing is easily removed by the abrasive action whereas the thicker portions of the pieces are not damaged or otherwise abused by the abrasive action. The duration of the freezing step of the cycle will vary for different size or type of rubber pieces being treated.

After the rubber pieces have been differentially frozen in the manner explained above, they are then exposed to the next step of the cycle which is the abrasive treating cycle. As shown better in FIGURES 4 and 5 a rotary wheel 50 is supported in a housing 52 attached to the roof-top as wall 44 which joins the side walls 41 of the conveyer area to cover the top of the conveyer area. The wheel 50 is rotated at high speed by motor 53 to propel abrasive media such as fine steel shot through an opening 54 in the roof-top 44 and against the frozen rubber pieces supported in the trough shaped conveyer. During the abrasive applying step, the plug 54' is automatically withdrawn from the opening 54. A baffle plate 55 extending horizontally from the freezing medium supply header 47 prevents abrasive from striking the header 47. The abrasive media is supplied to the blasting wheel 50 through storage bin 56 connected by passageway 57 to the wheel itself.

For further detailed description of the rotary blast wheel itself, reference is made, for instance, to Patents Nos. 2,869,289 and 2,732,666 as well as copending patent applications Serial No. 221,100, filed September 4, 1962 and Serial No. 195,698, filed May 18, 1962. Any type of wheel assembly may be used however.

It should be noted, as mentioned above, that during both the freezing step and the abrasive action step, the sprockets 35 and 37 are driven by a suitable motor drive mounted externally of the side walls 41 which enclose the conveyer area. This action causes the rubber pieces to tumble, rotate and otherwise change position whereby all surfaces of the pieces 42 are adequately exposed or subjected to both the freezing and abrasive treatment.

After the abrasive action has ceased, both the outer door 5 and the inner door 46 are automatically raised to open position. The direction of travel of the conveyor 29 is reversed and as seen in FIGURES 5 and 6 the rubber pieces 42 drop onto a slide plate 60 from which point they slide outwardly through the doorway 3 onto the unload conveyor 62 (see FIGURES 1 and 2). This slide plate 60 is automatically moved into position as shown in FIGURES 1, 5 and 6 when the unloading step of the cycle begins. After the rubber pieces are unloaded, the slide plate is then automatically retracted away from the conveyer 29 to permit the inner door 46 to close. This extension and retraction operation is controlled preferably by a carbon dioxide pressure cylinder operated through the control panel 27. The conveyer 62 is of the vibrating type driven by virbrator motor 63 attached thereto as shown in FIGURE 3 and having a perforated top deck whereby any abrasive which is unloaded with the rubber pieces is shaken from the pieces. This abrasive drops through the perforations onto a solid plate positioned below. This type of conveyer is important in that the abrasive must be removed before the rubber pieces begin to thaw out. If such is not done, the pieces collect moisture as they thaw after which the abrasive cannot be removed from the pieces which cause undesirable rust spotting and loss of abrasive.

Any suitable vibrating conveyer can be used here as long as it follows the general structure indicated above.

The abrasive and trim or flash that has been removed from the rubber pieces 42 in the trough conveyer 20 drops through the slats 31 which make up the conveyer 29 and onto a screen slide or chute 70 (FIGURE 5) which permits only the abrasive and finer pieces of flashing to pass. This abrasive drops onto a screen conveyer (not shown) or other conveying means and is fed to a scalping drum 72 (see FIGURE 5). In the scalping drum, the abrasive is further refined from the removed trim or flash with the flash discharged through the refuse discharge 74 (FIGURE 1) into a collection box 76 which can be removed and emptied by the user.

The specific structure of the scalping drum is described in Patent No. 2,711,189 and patent application Serial No. 22,588, filed April 15, 1960. From the scalping drum 72, the abrasive from which the larger pieces of trim or flash have been removed is passed into an elevator 75 which raises the abrasive upwardly to a separator 77 of an air wash type. The supply air for the separator is provided by the suction air being discharged from the dust collector which is described hereinafter. Here the abrasive passes through a stream of air whereby the fins and other light-weight contamination are removed. The specific structure of the separator can be that shown in Patent No. 2,771,189 and patent applications Serial No. 215,271, filed August 21, 1962 or Serial No. 22,588, filed April 15, 1960.

From the separator 77, the abrasive then passes down into the storage bin 56 for the abrasive from which it passes through conduit 57 to the abrasive wheel 50. The conduit 57 includes a suitable metering and purge gate assembly (not shown) for metering the abrasive to the wheel. This gate is disclosed and claimed in copending patent application Serial No. 214,271, filed August 2, 1962. Briefly, it is formed of an element having a blade extending therefrom which meters the flow of abrasive. When jammed, an air cylinder operated directly by a depressable button from the control panel 27 rotates the element to move the blade out of jammed position. At the same time another blade on the element moves into metering position.

To further clean the abrasive, if necessary, a portion of the abrasive is branched off from the storage bin 56 through a feed pipe 83 to a shaker conveyer similar to the unload conveyer 62 described above wherein the abrasive passes through a screen onto a solid plate position below the screen from which point it is returned to the blast wheel 50 or storage bin 56.

From the separator 77, the moving air stream containing the contamination removed from the abrasive in the separator 77 passes through delivery pipe 79 into a dust collector or filter assembly 81.

The dust laden air stream is then filtered through a series of dust bags (not shown) with the air stream being drawn by the fan 87 mounted on top of the dust collector. The air is discharged through opening 89. Suitable dust collectors can be found in Patents Nos. 3,053,031; 2,667,233; 2,876,862; and co-pending patent application Serial No. 825,097, filed July 6, 1959.

Contaminated air is also fed to the dust collector 81 through outlet 90 leading off from the area adjacent the conveyer 29.

It should be pointed out that when loading and unloading occurs, the ventilation of the trough conveyer through outlet 90 is cut off by damper 92 located in line 90. This prevents drawing warm air from outside the housing into the cooled system. The damper 92 must be open during the blasting operation to provide ventilation. However, it is also closed during the liquid carbon dioxide application against the rubber work pieces 42 to prevent drawing the cooling air thus interfering with the freezing operation. The damper operation is controlled by a carbon dioxide valve which is incorporated into the operation cycle through control panel 27. When the damper 92 is closed, the air coming from the conveyer 29 area is by-passed to draw air from the housing interior in order to maintain a constant flow to the air separator 77. Damper 94 positioned atop dust collector 81 is also closed and by-passed to the housing interior in a timed cycle as will be explained later.

Figure 7:
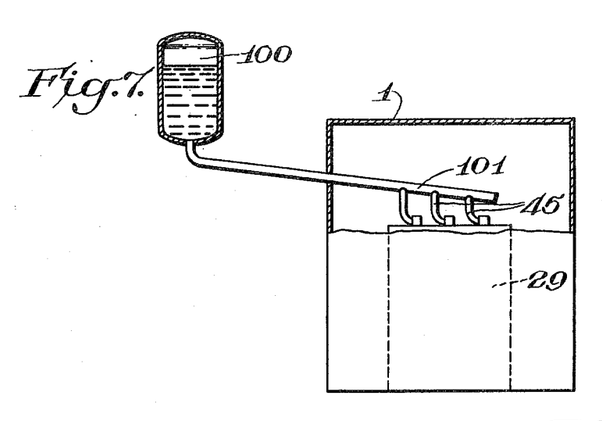
FIGURES 7–9 are diagrams of the liquid carbon dioxide distribution system.
Figure 8:
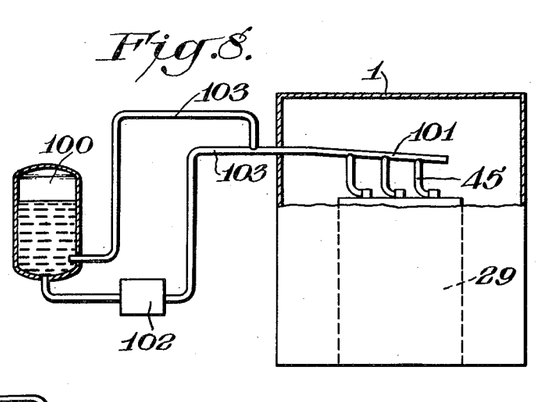
Figure 9:
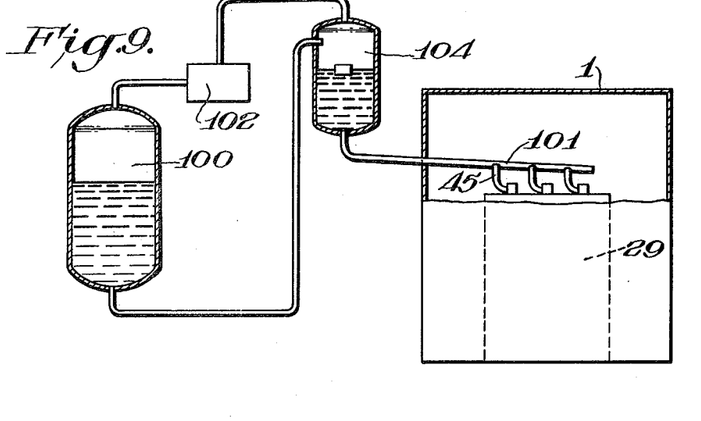
Figures 10, 10A:
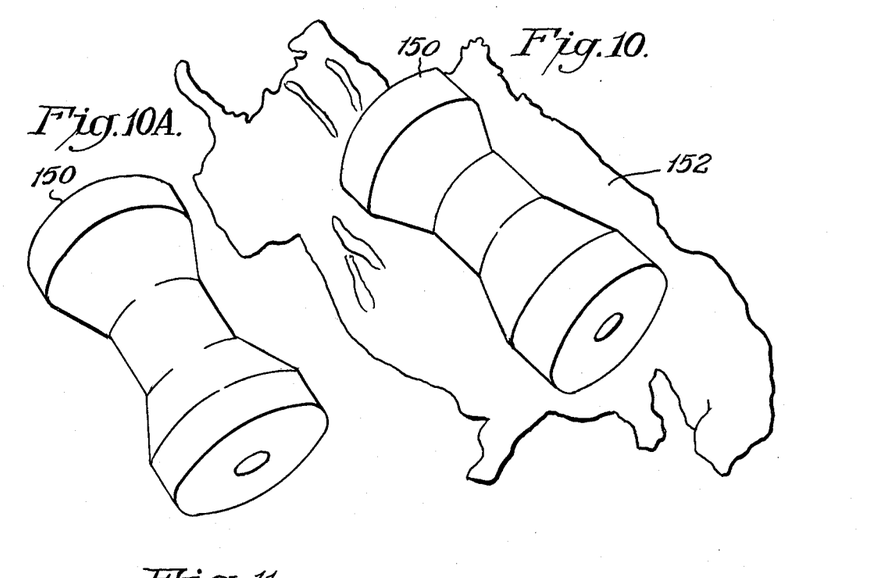
FIGURES 10, 10A, 11 and 11A show molded rubber pieces before and after the trimming operation.
Figure 11:
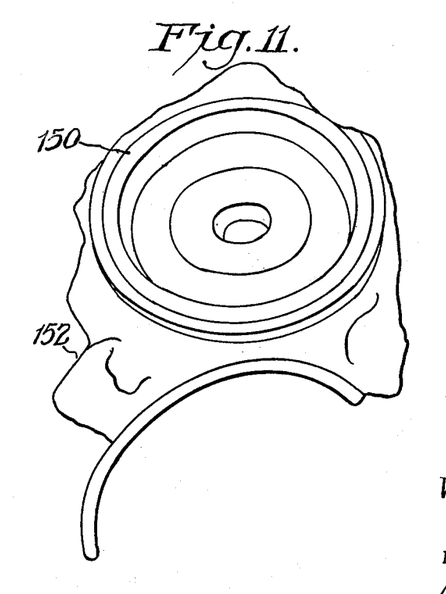
Figure 11A:
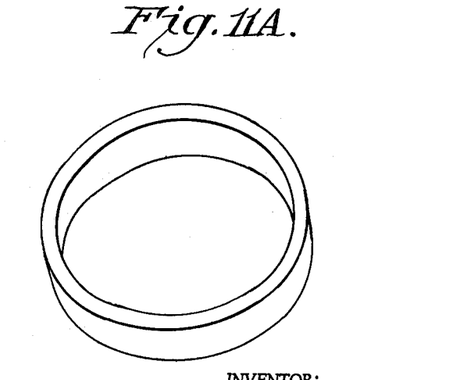

With regard to the liquid carbon dioxide feed and circulation system reference is made to FIGURES 7–9 of the drawing. FIGURE 7 shows a gravity system whereby the supply tank 100 is held at a higher level than the solenoid operated discharge valves 45. The header 101 dead-ends in the interior of the cabinet 1. The header and supply pipe connecting the header 101 and the supply tank 100 is pitched downwardly (min. ⅜″ per ft.) except for the portion extending through the cabinet wall.

FIGURE 8 shows a recirculating type where a recirculating pump 102 continually circulates the liquid $CO_2$ from the supply tank 100 through supply line loop formed by lines 103. At the cabinet wall 1, the header 101 is connected with the loop 103 and dead-ends inside the cabinet as in FIGURE 7. Inside the cabinet, the header pitches down at a min. of ⅜′ per ft.

FIGURE 9 shows a reduced pressure system whereby liquid $CO_2$ is taken from the storage tank 100 and held in a smaller control tank 104 in which the air pressure is equal or below the pressure of the supply tank. Here, also, the supply line from the reservoir and the header are pitched downwardly as explained above with the header 101 dead-ending in the cabinet 1.

Liquid $CO_2$ in the so-called "low pressure" system as commonly used for industrial applications is held in the storage tank at about 300 p.s.i.g. The pressure in the storage tank is maintained by a mechanical refrigeration system which controls the temperature.

Flash freezing of rubber and plastic parts and the maintaining of the frozen flash during the heat generated by a blast cycle is accomplished by heavy flows of $CO_2$ for short time intervals. Normally, when the warm parts are put into the deflashing machine, a preliminary $CO_2$ injection in the order of 5 sec. to 20 sec. is used to reduce the temperature of the entire load of work parts. When the flash is frozen, steel abrasive is projected at high velocity against the work to break off the flash. This mechanical work induces a heat build-up, so that the blast is interrupted at regular intervals and very short bursts of liquid $CO_2$ are injected to counteract the heat of the blast operation.

FIGURES 10, 10A, 11 and 11A show freshly molded rubber articles 150 which still have the flash 152 attached thereto. The molded article 150 is also shown after the flash has been removed.

Figure 4:
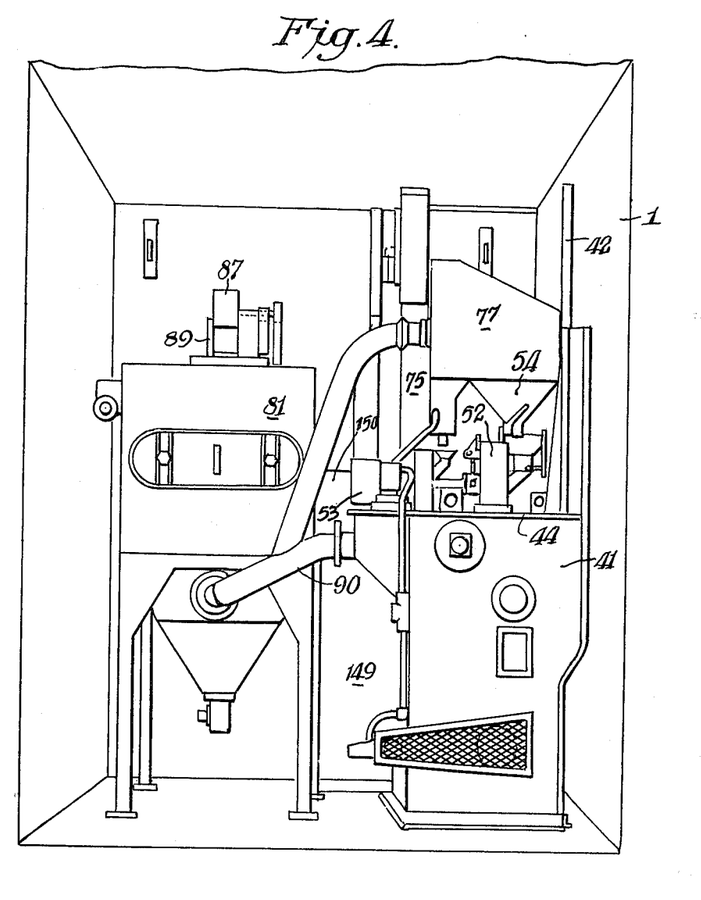
FIGURE 4 is an interior view of the housing taken from one side thereof.
Figure 12:
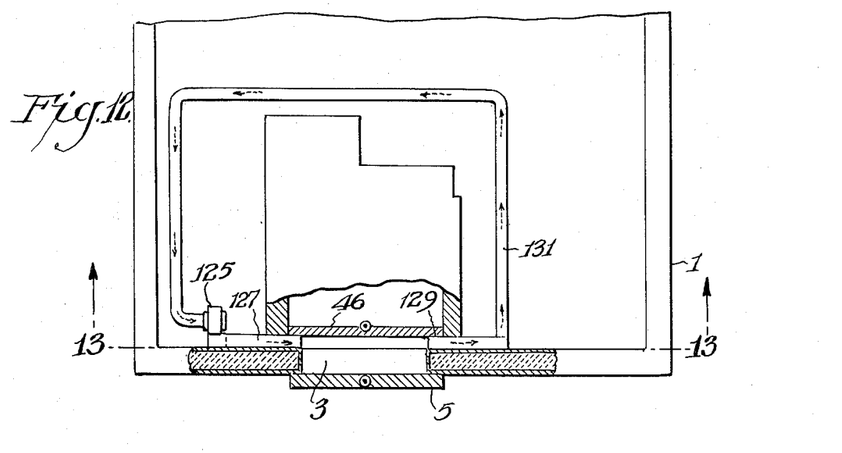
FIGURE 12 is a top view showing the assembly for directing an air curtain across the open doorway during the loading and unloading operation.
Figure 13:
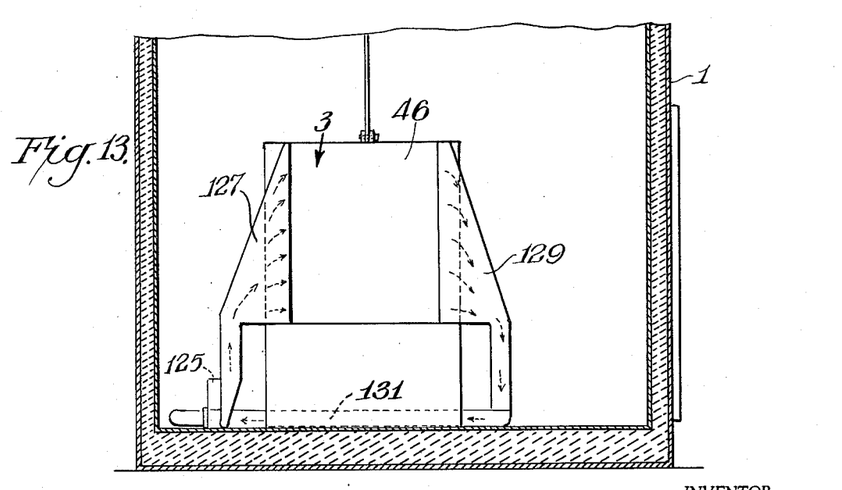
FIGURE 13 is a section along lines 13—13 of FIGURE 12.

To prevent external air from entering the housing interior and thus raise the temperature within the housing when the doors 5 and 46 are open for loading and unloading the rubber pieces, mechanism is provided to supply a curtain of cool air across the doorway 3, the inner doorway accommodating inner door 46 of the conveyer 29 and the main door 149 (see FIGURES 1 and 4). As seen in the front view of FIGURE 13, a fan 125 propels air through an elongated nozzle 127 which extends along one side, and on the inner side of the housing 1 of the doorway 3. The air is propelled across the doorway by fan 125 and is taken up by intake slot 129 supported in a corresponding position on the opposite side of the doorway 3. The intake 129 is connected by recirculation duct 131 (FIGURE 12) positioned within the housing to the suction side of the fan 125. The air is cooled by the surrounding cold atmosphere of the housing interior as it travels through the recirculation duct 131 to thereby provide a cool air curtain across the open doorway 3 to prevent ingress of hot air or egress of cool air into and out of the housing 1 during the loading and unloading of the rubber parts 42. If desired, the nozzle and intake slot may be arranged at the top and bottom of the doorway 3 to provide a vertical curtain rather than a horizontal curtain.

FIGURES 14-19 are comparison photographs which illustrate the beneficial quality of the air curtain. As seen in these figures, the inner door 46 and the outer door 5 are in full open position.

Figure 14:
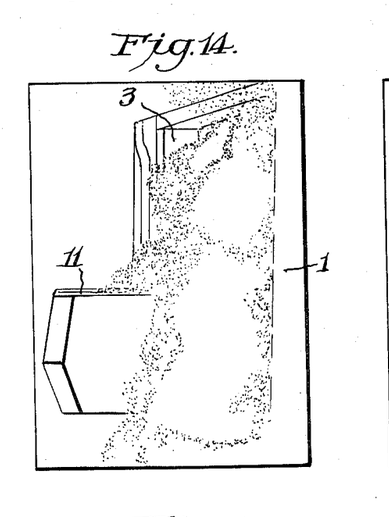
FIGURES 14–19 are comparison photographs showing the beneficial effect of the air curtain of FIGURES 12 and 13.
Figure 16:
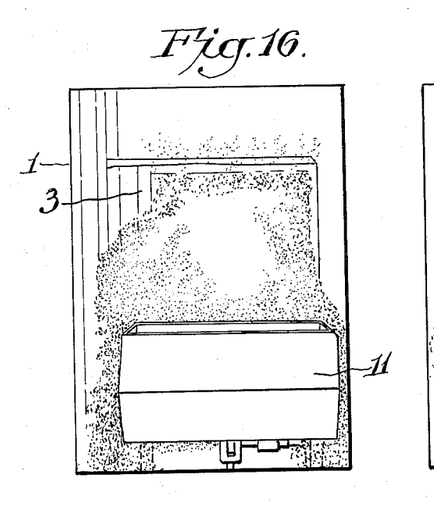

FIGURES 14 and 16 illustrate what occurs when the air curtain fan 125 is not operating and the $CO_2$ nozzles 45 are injecting $CO_2$ into the conveyer trough 29 supported within the housing. As shown in these figures, the $CO_2$ passes freely through the doors in large quantities.

Figure 15:
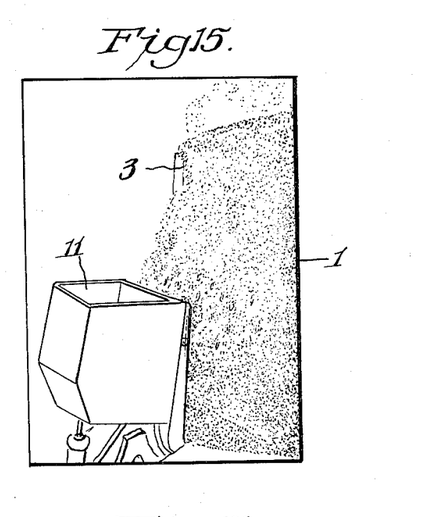
Figure 17:
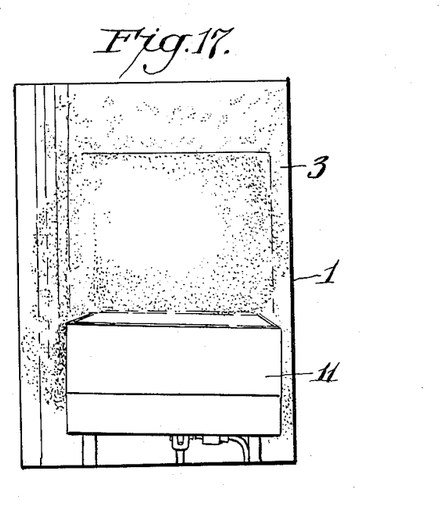

FIGURES 15 and 17 are similar views to FIGURES 14 and 16 except here the air curtain fan is operated to provide a curtain of air across the outer doorway 3. From FIGURES 15 and 17, it is seen that a good part of the $CO_2$ is blocked off and prevented from passing into the outer room.

Figure 18:
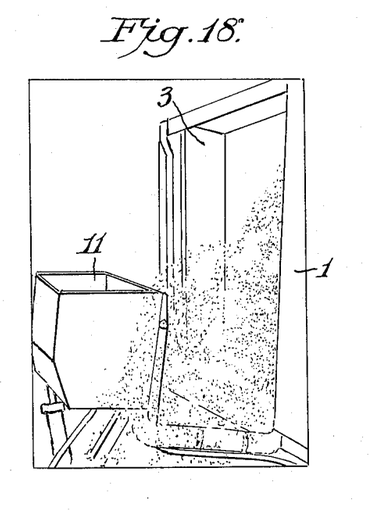
Figure 19:
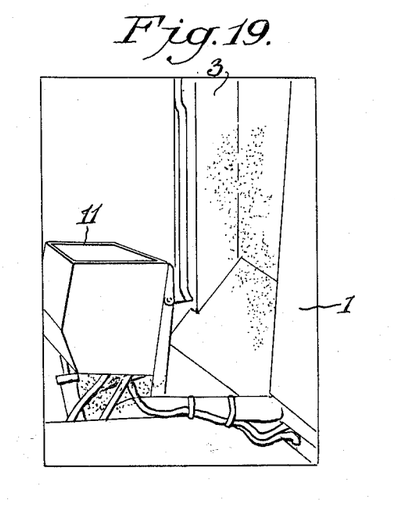

FIGURES 18 and 19 illustrate the condition wherein the air curtain fan and the $CO_2$ nozzles are off (FIGURE 18) and wherein the air curtain fan is on with the $CO_2$ nozzles off (FIGURE 19). With the air curtain fan off (FIGURE 18), the vapor is shown spilling out of the housing 1 into the outer room. On the other hand, when the air curtain is operating (FIGURE 19), the vapor is shown contained within the housing 1 so that it does not pass through the doorway 3 into the outer room.

The air curtain nozzle and intake can be positioned externally of the housing, for instance, by extending their connections through the front walls of the housing.

Figure 20:
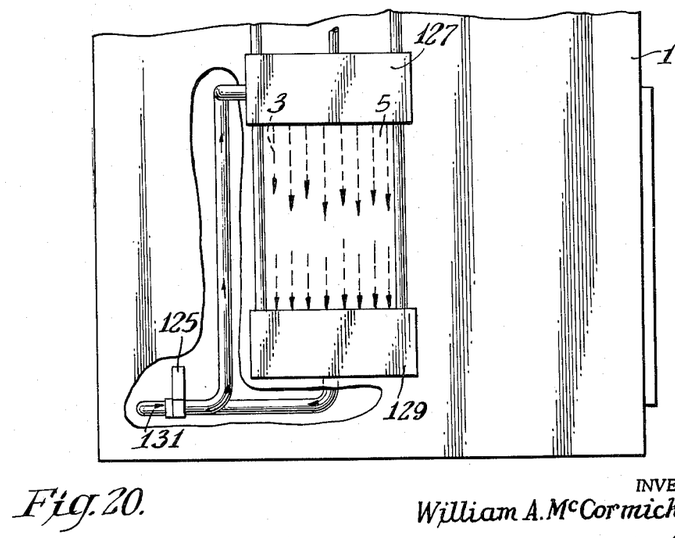
FIGURE 20 is a front view of an embodiment of the arrangement of FIGURES 12 and 13.

Also, the air curtain nozzle can be positioned over the doorway to direct a stream of air downwardly of the doorway. The nozzle and its lower intake can be positioned internally of the housing or externally thereof as shown in FIGURE 20 or omitted entirely.

The air curtain provides the advantage of maintaining substantially uniform humidity and temperature conditions within the housing 1 when the doors are open during the piece loading and unloading operation. This provides greater economy in operation regarding $CO_2$ input and also cuts down on the time which would normally be required to restore the housing interior to its desired humidity and temperature conditions after a loading or unloading operation if an air current as described above is not used.

The various mechanisms described above throughout the application are preferably operated by carbon dioxide valves wherever possible. These valves are connected with the control panel to operate in a timed cycle.

The cyclic operation of the assembly described above is as follows:

(1) Doors closed—machine shut down;
(2) Press cycle start button (panel 27);
(3) Abrasive system starts and remains running for successive cycles; abrasive recirculating "starts";
(4) Room and conveyer, (5, 46) doors "open," air curtain "on," exhauster (90) stops (if running); work conveyer reverses to unload; damper (92) by-passes to room, collector shaker (62) "starts"; damper 94 closes; after 5 seconds, collector shaker (62) "stops";
(5) Work conveyer (29) forward—loader "up and down"; approximately 10 seconds;
(6) Room and conveyer (5, 46) doors close, air curtain off, damper (94) opens, exhaust (90) starts;
(7) Primary freeze on, hold damper 92 by-pass to room;
(8) Blast wheel (50) starts (no abrasive yet);
(9) Primary freeze off, blast on; abrasive recirculating stops; damper (92) returns to normal;
(10) Each secondary freeze, damper 92 by-passes to room; blast off each time;
(11) Blast timer times out—blast shuts "off"; abrasive recirculating starts;
(12) After 60 seconds for draining abrasive from load, work conveyer stops and cycle ends;
(13) Abrasive system and exhauster (90) remain running, abrasive recirculating operating; dampers (92 and 94) in normal position;
(14) To repeat cycle, press cycle start button and sequence repeats from #4 above;
(15) Damper gate 92 when operated to by-pass, disconnects conveyer (29) ventilation from exhaust separator-ventilation remains on;
(16) Damper gate 94 when operated disconnects exhauster from unload shaker (62) separator (977) and conveyer (29);
(17) Damper gate 92 operates to by-pass whenever doors are open or freeze is turned on; and
(18) Damper gate 94 closes whenever load doors are open.

Obviously many modifications and variations of the present invention are possible in the light of the above teachings. It is, therefore, to be understood that within the scope of the appended claims the invention may be practiced otherwise than as specifically described.

What is claimed is:

1. Apparatus for deflashing molded resilient pieces comprising a cooling and dehumidifying housing, a piece loading and unloading doorway for said housing, means supported within the housing for simultaneously supporting and turning said molded pieces having flashing, a freezing medium applicator means within said housing adjacent said piece supporting and turning means for applying freezing medium to said pieces to lower the temperature of said molded pieces, abrasive blasting means supported within said housing adjacent said piece supporting and turning means for propelling abrasive against said cooled work pieces to remove the flashing therefrom, means adjacent the molded piece supporting and turning means for collecting the used abrasive and the removed flashing, means for separating the removed flashing from said used abrasive, means for conveying the separated used abrasive to a point for reuse by the blasting means, a dust collector positioned within said housing, and means adjacent said housing doorway for providing an air curtain across said doorway when the door is raised to open position.

2. The apparatus of claim 1 wherein the air curtain providing means comprises an elongated air nozzle supported along one side of said doorway, an air intake slot supported along the opposite side of said doorway, an air recirculation line leading off from the intake, a fan connected to the other end of said recirculation line and said nozzle.

3. The apparatus of claim 2 wherein the nozzle and intake are supported at the top and bottom of said doorway.

4. The apparatus of claim 2 wherein the recirculation line is supported within the housing interior.

5. The apparatus of claim 2 wherein the nozzle is located on the inner side of said doorway.

6. The apparatus of claim 2 wherein the nozzle is located on the outer side of said doorway.

7. The apparatus of claim 3 wherein the nozzle is located on the outer side of said doorway.

8. The apparatus of claim 3 wherein the nozzle is located on the inner side of said doorway.

9. The apparatus of claim 1 wherein an air wash separator is also provided within said housing for separating finer contamination from the used abrasive.

10. The apparatus of claim 9 wherein a ventilator leads off from said air wash separator and is connected to a dust collector.

11. The apparatus of claim 1 wherein said piece supporting and turning means is an endless belt type conveyer assembly formed of spaced and transversely extending slats, the rear support for the belt being rotatably supported at a point higher than the front rotatable belt support, side and top walls enclosing said belt, rotatable end discs supported in the side walls which are urged against the top flight of said belt to form a trough in the belt, a vertically moving door provided for the loading and unloading end of said belt which door fits close against the side and top walls when lowered in position, and the means for applying said freezing medium is so positioned so as to apply said medium against the top flight of said belt.

12. The apparatus of claim 11 wherein a retractible slide plate is supported in front of said lower rotatable support for said belt, and control means are provided for moving the plate into position adjacent the belt when the belt travel is reversed for unloading the pieces.

13. The apparatus of claim 1 wherein said housing contains a doorway, a vertically movable door in said doorway, a work piece bucket loader supported externally of said housing adjacent said doorway, vertically reciprocating support means for said bucket loader, and reciprocating means connected with said bucket loader, and reciprocating means connected with said bucket and support for tipping said bucket, said support and tipping means cooperating to move the bucket loader into and through the housing doorway to a discharge position above said piece supporting and turning means.

14. The apparatus of claim 1 wherein refrigerating means are provided in said housing for cooling the area enclosed thereby.

15. The apparatus of claim 1 wherein remote control means is provided for operating the units in a timed cycle.

16. The apparatus of claim 13 wherein a vibrating conveyer-separator means is provided externally of the housing doorway for receiving the pieces discharged from the housing for separating abrasive from the pieces and to convey the pieces to a collection point.

17. The apparatus of claim 13 wherein a purge gate is provided adjacent said blasting means to release any jammed abrasive being fed to the blasting means.

18. Apparatus for deflashing molded resilient pieces comprising a cooling and dehumidifying housing, a piece loading and unloading doorway for said housing, means supported within the housing for simultaneously supporting and turning said molded pieces having flashing, a freezing medium applicator means within said housing adjacent said piece supporting and turning means for applying freezing medium to said pieces to lower the temperature of said molded pieces, abrasive blasting means supported within said housing adjacent said piece supporting and turning means for propelling abrasive against said cooled work pieces to remove the flashing therefrom, means adjacent the molded piece supporting and turning means for collecting the used abrasive and the removed flashing, means for separating the removed flashing from said used abrasive, means for conveying the separated used abrasive to a point for reuse by the blasting means, a dust collector positioned within said housing, ventilating means leading off from said molded piece supporting and turning means which ventilating means is connected with said dust collector, means within said ventilating means for temporarily closing off said ventilating means from said dust collector, and means adjacent said housing doorway for providing an air curtain across said doorway when the door is raised to open position.

19. The apparatus according to claim 14 wherein automatic control means is provided for operating the units in a timed cycle.

20. The apparatus of claim 1 wherein the freezing medium applicator comprises a $CO_2$ storage tank, a supply line leading therefrom, and a header connected with said supply line, said header being supported within said housing with said supply line and header being pitched downwardly.

21. A method for deflashing molded resilient pieces comprising loading said pieces into a dehumidified treating area, providing an air curtain between said treating area and the surrounding atmosphere during said loading step, closing off said treating area, continuously turning and rotating said pieces in said treating area, applying a freezing medium against said pieces as they are rotated to freeze the flashing of the pieces, shutting off the ventilation during the freezing step, terminating the freezing medium application, blasting said pieces with abrasive to remove the frozen flashing therefrom, resuming the ventilation during the blasting operation, terminating the abrasive blasting, collecting the removed flashing and used abrasive, separating the removed flashing from the used abrasive returning the abrasive for reuse in the blasting operation, unloading the deflashed pieces from the dehumidified treating area, providing an air curtain between said treating area and said surrounding atmosphere during said unloading step, and shutting off the ventilation during the unloading step.

22. The method of claim 21 wherein the treating area is directly ventilated to a suction conduit.

23. The method according to claim 21 wherein the air of the curtain is collected and recirculated.

24. The method according to claim 23 wherein the air is cooled as it is recirculated.

25. The method of claim 21 wherein the separated abrasive is further separated from finer contamination.

26. The method of claim 21 wherein liquid carbon dioxide is used as the freezing agent.

27. The method of claim 21 wherein the treating area is dehumidified by refrigeration means.

28. Apparatus for deflashing molded resilient pieces comprising a cooling and dehumidifying housing, a piece loading and unloading doorway for said housing, means supported within the housing for simultaneously supporting and tumbling said molded pieces having flashing, a freezing medium applicator means within said housing adjacent said piece supporting and turning means for applying freezing medium to said pieces to lower the temperature of said molded pieces, and means adjacent said housing doorway for providing an air curtain across said doorway when the door is raised to open position.

29. A method for deflashing molded resilient pieces comprising loading said pieces into a dehumidified treating area, providing an air curtain between said treating area and the surrounding atmosphere during said loading step, closing off said treating area, continuously tumbling said pieces in said treating area, applying a freezing medium against said pieces as they are rotated to freeze the flashing of the pieces, unloading the deflashed pieces from the dehumidified treating area, and providing an air curtain between said treating area and said surrounding atmosphere during said unloading step.

References Cited in the file of this patent
UNITED STATES PATENTS

| | | |
|---|---|---|
| 2,533,653 | Winkeljohn | Dec. 12, 1950 |
| 2,682,732 | Hanrahan et al. | July 6, 1954 |
| 2,719,387 | Fahrney | Oct. 4, 1955 |
| 2,881,571 | Granata | Apr. 14, 1959 |
| 2,996,846 | Leliaert | Aug. 22, 1961 |
| 3,008,274 | Welter | Nov. 14, 1961 |
| 3,048,947 | Fahrney et al. | Aug. 14, 1962 |
| 3,049,837 | Freeman | Aug. 21, 1962 |
| 3,081,580 | Powell et al. | Mar. 19, 1963 |